Patented June 29, 1937

2,085,452

UNITED STATES PATENT OFFICE 2,085,452

HIGH MOLECULAR WEIGHT SULPHUR COMPOUNDS

Paul L. Salzberg, Carrcroft, Del., assignor to E. I. du Pont de Nemours & Company, Wilmington, Del., a corporation of Delaware No Drawing. Application August 31, 1934, Serial No. 742,283

7 Claims. (Cl. 260—151)

This invention relates to new compositions of matter, and more particularly to new compositions of matter comprising high molecular weight sulphur compounds, and still more particularly to organic esters of hydrogen sulphide wherein at least one hydrogen atom of the hydrogen sulphide molecule is replaced by a hydrocarbon radical containing 10 to 15 carbon atoms and derived from a straight chain primary alcohol.

This case is a continuation in part of copending application Serial No. 649,448, filed December 29, 1932 which became Patent No. 2,030,093 on February 11, 1936.

This invention has as an object the provision of processes for the preparation of new mercaptans and new sulphides. A further object is the class of mercaptans thus produced. A still further object is the class of sulphides thus produced. Other objects will appear hereinafter.

These objects are accomplished by the following invention wherein an inorganic acid ester of a straight chain primary alcohol containing from 10 to 15 carbons, such as the halide thereof, is reacted with an alkali metal salt of hydrogen sulphide.

The following examples illustrate but do not limit the invention.

*Example 1.—Dodecyl mercaptan*

Thirty-six parts by weight of potassium hydroxide was dissolved in 160 cc. of absolute ethyl alcohol and saturated with hydrogen sulphide in a 500 cc. 3-neck flask attached to a reflux condenser. One hundred grams of dodecyl bromide was added from a dropping funnel during the course of one hour. A copious precipitate formed at once. When all the dodecyl bromide was added the solution was refluxed two hours with hydrogen sulphide bubbling in. An insoluble layer formed above the alcohol solution. The alcohol solution was diluted with water and the dodecyl mercaptan extracted with ether. After removal of the ether the product was distilled. Fifty-six parts by weight boiled 154°–155° C./23 mm. The colorless oil which had a mild, pleasant odor contained 16% sulphur.

*Example 2.—Mixed dodecyl tetradecyl mercaptan*

A mixture of dodecyl alcohol and tetradecyl alcohol obtained by the carboxylic hydrogenation of coconut oil followed by distillation of the alcohol-containing product and separation of the middle fraction having an average molecular weight of 206 was converted to the mixed chlorides by treatment with hydrogen chloride. Forty-five parts by weight of potassium hydroxide dissolved in 250 cc. of butyl alcohol was placed in a 500 cc. 3-neck flask under a reflux condenser, and saturated with hydrogen sulphide. One hundred twelve parts by weight of the mixed dodecyl tetradecyl chlorides was added slowly from a dropping funnel. The reaction mixture was refluxed 8 hours and the potassium chloride which separated was filtered off. The weight of this salt indicated the reaction was practically complete. The butyl alcohol solution was diluted with 150 cc. benzene and washed with water until neutral. The solution was dried with a small amount of sodium sulphate and the solvents were evaporated. One hundred parts by weight of light brown oil was isolated which analyzed 11.6% sulphur, and consisted largely of a mixture of dodecyl and tetradecyl mercaptans, the dodecyl mercaptan being in excess.

*Example 3.—Dodecyl mercaptan*

Two hundred parts by weight of dodecyl bromide were converted to dodecyl mercaptan by the procedure described in Example 1. Distillation of the product yielded a colorless oil which boiled at 112°–115° C./5 mm. and contained 15.6% sulphur. The residue in the distilling flask was solid and was recrystallized twice from hot alcohol. The white plates melted 40° C. and a mixed melting point indicated the material to be didodecyl sulphide.

*Example 4.—Didodecyl sulphide*

Fifty-nine and eight-tenths parts by weight of dodecyl bromide, 15 parts by weight of sodium sulphide were dissolved in 100 cc. of absolute alcohol and heated to the reflux temperature, 75°–80° C., in a flask beneath a reflux condenser. After heating 7 hours the product was diluted with ether and washed with water. The ether solution was dried with a small amount of sodium sulphate and the ether evaporated. The white plates were recrystallized from absolute alcohol and melted 40°–42° C. Sulphur analysis indicated a sulphur content of 8.7%.

*Example 5.—Mercaptans of coconut alcohols*

A mixture of coconut alcohols obtained by the carboxylic hydrogenation of coconut oil and consisting of hexyl alcohol 4 parts, octyl alcohol 81 parts, decyl alcohol 60 parts, dodecyl alcohol 390 parts, tetradecyl alcohol 160 parts, cetyl alcohol 115 parts, octadecyl alcohol 55 parts, eicosyl alcohol 15 parts, was converted to a mixture of chlorides of average molecular weight 218.5 by treatment with hydrogen chloride in the presence of zinc chloride. Forty-five parts by weight of potassium hydroxide dissolved in 250 cc. of butyl alcohol was placed in a 500-cc. 3-neck flask under a reflux condenser and saturated with hydrogen sulphide. One hundred ten parts by weight of the mixed chlorides was added slowly from a dropping funnel. The reaction mixture was refluxed 8 hours and the potassium chloride which separated was filtered off. The weight of this salt indicated the reaction was practically complete. The butyl alcohol solution was diluted with 150 cc. benzene and washed with water until neutral. The solution was dried with a small amount of sodium sulphate and the solvents were evaporated. The resulting light brown oil was a mixture of the various mercaptans, containing a major proportion of tetradecyl and dodecyl mercaptans, the latter being present in excess.

The sulphides and mercaptans of the present invention have the general formula: RSX, wherein R is a hydrocarbon radical derived from a primary aliphatic saturated alcohol containing 10 to 15 carbon atoms, such as decyl, undecyl, dodecyl, tetradecyl, and pentadecyl.

A convenient source of the radical R is the mixture of alcohols obtained by the carboxylic hydrogenation of essentially saturated natural oils such as coconut oil, palm kernel oil, or the acids obtained from such oils by hydrolysis. This alcohol mixture will contain a major proportion of tetradecyl and dodecyl alcohols, the dodecyl alcohol being in excess of the tetradecyl alcohol. A particularly desirable mixture of alcohols for this purpose is obtained by the carboxylic hydrogenation of coconut oil or of palm kernel oil followed by distillation of the alcohol mixture and the separation and use of the middle fraction containing the tetradecyl and dodecyl alcohols together with small amounts of other alcohols.

In the general formula, X may stand for hydrogen or an aliphatic hydrocarbon radical identical with R.

While alcohols are preferred solvents for carrying out the reaction between the sodium sulphide salt, since both the alkyl halides and the alkali hydrosulphides are mutually soluble therein, any solvent exhibiting this property may be employed. A mixture of solvents may be employed. The reaction may also be carried out without the use of a solvent by simply heating the alkali hydrosulphide with an alkyl halide. It is advantageous to maintain an excess of hydrogen sulphide during the reaction of the alkyl halide with the alkali hydrosulphide, and it is sometimes desirable to heat the reaction components under pressure to insure the presence of an excess of hydrogen sulphide.

The compounds are emulsifying agents and may be used in the rubber and pharmaceutical industries. They may also be used as softening agents, corrosion inhibitors in acid pickling baths, and as flotation agents. They are further useful as starting substances for further valuable organic conversion products. Thus, sulphones, sulphonic acids, and the like may be prepared.

The above description and examples are intended to be illustrative only. Any modification of or variation therefrom which conforms to the spirit of the invention is intended to be included within the scope of the claims.

I claim:
1. Process for the preparation of esters of hydogen sulphide, which comprises heating a compound of the formula: R—Y wherein R is a straight chain saturated aliphatic radical of 10 to 15 carbon atoms, and Y is the radical of an oxygen free inorganic acid with a sulphide salt of the formula: MSX wherein M is an atom of an alkali metal and X is a member of the group consisting of the alkali metals and hydrogen.

2. Process for the preparation of esters of hydrogen sulphide wherein a straight chain saturated aliphatic halide of 10 to 15 carbon atoms is heated with a sulphide salt of the formula: MSX wherein M is an atom of an alkali metal and X is a member of the group consisting of the alkali metals and hydrogen.

3. Process for the preparation of esters of hydrogen sulphide wherein a dodecyl halide is heated with a sulphide salt of the formula: MSX wherein M is an atom of an alkali metal and X is a member of the group consisting of the alkali metals and hydrogen.

4. Process for the preparation of esters of hydrogen sulphide wherein a dodecyl halide is heated with: MSH wherein M is an alkali metal.

5. Process for the preparation of esters of hydrogen sulphide wherein a dodecyl halide is heated with: $M_2S$ wherein M is an alkali metal.

6. A process for making dodecyl mercaptan which comprises heating dodecyl bromide with an alkali metal hydrosulphide in an alcohol solution.

7. A process for preparing didodecyl sulphide which comprises heating dodecyl bromide with sodium sulphide in an alcohol solution.

PAUL L. SALZBERG.